United States Patent

(12) United States Patent
Minei

(10) Patent No.: US 10,137,940 B2
(45) Date of Patent: Nov. 27, 2018

(54) VEHICLE MEMBER JOINING STRUCTURE AND VEHICLE MEMBER JOINING METHOD

(71) Applicant: TOYOTA JIDOSHA KABUSHIKI KAISHA, Toyota-shi, Aichi-ken (JP)

(72) Inventor: Taichi Minei, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 244 days.

(21) Appl. No.: 15/072,966

(22) Filed: Mar. 17, 2016

(65) Prior Publication Data
US 2016/0347377 A1 Dec. 1, 2016

(30) Foreign Application Priority Data
May 27, 2015 (JP) .................................. 2015-107368

(51) Int. Cl.
*F16B 5/04* (2006.01)
*F16B 11/00* (2006.01)
(Continued)

(52) U.S. Cl.
CPC ............ *B62D 29/005* (2013.01); *B29C 65/48* (2013.01); *B29C 65/4855* (2013.01);
(Continued)

(58) Field of Classification Search
None
See application file for complete search history.

(56) References Cited

U.S. PATENT DOCUMENTS 2,140,672 A * 12/1938 Gray ..................... B64D 37/02
114/224
2,242,269 A * 5/1941 Siebler ................. B62D 29/043
296/181.2
(Continued)

FOREIGN PATENT DOCUMENTS

DE 3035644 A * 5/1982
DE 3601262 A1 * 7/1987
(Continued)

OTHER PUBLICATIONS

Zhang et al., A method for predicting the curing residual stress for CFRP/Al adhesive single-lap joints, Oct. 2013, International Journal of Adhesion, vol. 46, pp. 7-13 (Year: 2013).*
(Continued)

*Primary Examiner* — Jeffrey A Vonch
(74) *Attorney, Agent, or Firm* — Oliff PLC

(57) ABSTRACT

A vehicle member joining structure has: a metal member that is part of a vehicle; a resin member that is adjacent to the metal member; and an adhesive that is provided between the metal member and the resin member and joins the metal member to the resin member, the adhesive having an elastic modulus that is lower than elastic moduli of the metal member and the resin member, wherein, given that (i) ΔL is a difference in linear expansions of the metal member and the resin member at a time of heating in a drying process after application of the adhesive, (ii) $T_0$ is a thickness of the adhesive and (iii) $T_1$ is a length of an end surface of the adhesive, the following predetermined relational expression is satisfied $T_1^2 = T_0^2 + \Delta L^2$.

4 Claims, 8 Drawing Sheets

(51) Int. Cl.
  *B62D 21/02* (2006.01)
  *B62D 25/04* (2006.01)
  *B62D 27/00* (2006.01)
  *B62D 29/00* (2006.01)
  *B29C 65/48* (2006.01)
  *B29C 65/56* (2006.01)
  *B29C 65/60* (2006.01)
  *B29C 65/62* (2006.01)
  *B29C 65/00* (2006.01)
  *B29C 65/72* (2006.01)
  *C08J 5/12* (2006.01)
  *B32B 15/08* (2006.01)
  *B32B 7/08* (2006.01)
  *B32B 7/12* (2006.01)
  *B32B 3/26* (2006.01)
  *B32B 7/02* (2006.01)
  *B29L 31/30* (2006.01)
  *B29C 65/64* (2006.01)
  *B29C 65/52* (2006.01)

(52) U.S. Cl.
  CPC ............ *B29C 65/56* (2013.01); *B29C 65/562* (2013.01); *B29C 65/72* (2013.01); *B29C 66/112* (2013.01); *B29C 66/73112* (2013.01); *B29C 66/742* (2013.01); *C08J 5/12* (2013.01); *B29C 65/483* (2013.01); *B29C 65/484* (2013.01); *B29C 65/485* (2013.01); *B29C 65/4835* (2013.01); *B29C 65/522* (2013.01); *B29C 65/64* (2013.01); *B29C 66/131* (2013.01); *B29C 66/53461* (2013.01); *B29C 66/61* (2013.01); *B29C 66/7315* (2013.01); *B29L 2031/30* (2013.01); *B29L 2031/3002* (2013.01); *B32B 3/266* (2013.01); *B32B 7/02* (2013.01); *B32B 7/08* (2013.01); *B32B 7/12* (2013.01); *B32B 15/08* (2013.01); *B32B 2307/732* (2013.01); *B32B 2605/00* (2013.01); *B32B 2605/08* (2013.01); *B60Y 2410/125* (2013.01); *F16B 5/04* (2013.01); *F16B 11/006* (2013.01); *Y10T 428/24025* (2015.01); *Y10T 428/24182* (2015.01); *Y10T 428/24322* (2015.01); *Y10T 428/24752* (2015.01); *Y10T 428/24942* (2015.01); *Y10T 428/249923* (2015.04)

(56) References Cited

U.S. PATENT DOCUMENTS

| | | | | |
|---|---|---|---|---|
| 4,472,861 A * | 9/1984 | Joseph | ................. | F16B 5/0692 210/445 |
| 4,475,765 A * | 10/1984 | Vogt | ................. | B62D 25/06 296/210 |
| 4,973,102 A * | 11/1990 | Bien | ................. | B62D 29/048 296/187.01 |
| 5,009,557 A * | 4/1991 | Dessirier | ................. | B21J 15/02 29/524.1 |
| 5,358,302 A * | 10/1994 | Schoen | ................. | B62D 29/04 296/191 |
| 5,964,490 A * | 10/1999 | Schroeder | ................. | B62D 24/00 156/291 |
| 6,083,604 A * | 7/2000 | Haraga | ................. | F16B 5/00 403/375 |
| 6,138,419 A * | 10/2000 | Sekiguchi | ................. | B21J 15/02 52/235 |
| 6,394,537 B1 * | 5/2002 | DeRees | ................. | B62D 29/048 296/191 |
| 6,511,120 B1 * | 1/2003 | Mitts | ................. | E05D 5/0207 16/382 |
| 6,592,174 B1 * | 7/2003 | Rollin | ................. | B62D 29/001 296/100.16 |
| 6,749,254 B1 * | 6/2004 | Kleven | ................. | B62D 25/105 296/191 |
| 9,580,111 B1 * | 2/2017 | Caliskan | ................. | B62D 29/043 |
| 2003/0001410 A1 * | 1/2003 | Cate | ................. | B62D 21/152 296/193.06 |
| 2003/0056872 A1 * | 3/2003 | Morrison | ................. | B62D 25/145 156/91 |
| 2003/0134090 A1 * | 7/2003 | Tate | ................. | B62D 29/001 428/174 |
| 2004/0018341 A1 * | 1/2004 | Richardson | ................. | B62D 25/04 428/138 |
| 2004/0187289 A1 * | 9/2004 | Toback | ................. | E04B 1/24 29/458 |
| 2005/0140158 A1 * | 6/2005 | Ogawa | ................. | B62D 25/07 296/29 |
| 2005/0214096 A1 * | 9/2005 | Zaluzec | ................. | B62D 23/00 411/104 |
| 2005/0220533 A1 * | 10/2005 | Prichard | ................. | B21J 15/02 403/282 |
| 2005/0244215 A1 * | 11/2005 | Prat | ................. | F16B 11/006 403/268 |
| 2007/0145188 A1 * | 6/2007 | Specht | ................. | B29C 65/00 244/125 |
| 2008/0036235 A1 * | 2/2008 | Ameloot | ................. | B62D 25/04 296/102 |
| 2009/0202294 A1 * | 8/2009 | Apfel | ................. | F16B 5/02 403/267 |
| 2009/0278371 A1 * | 11/2009 | Fuchs | ................. | B23K 11/11 296/29 |
| 2009/0304438 A1 * | 12/2009 | Kolax | ................. | B64C 1/064 403/24 |
| 2010/0259073 A1 * | 10/2010 | Gruneklee | ................. | B62D 25/06 296/225 |
| 2011/0031776 A1 * | 2/2011 | Edwards | ................. | B62D 25/2054 296/97.23 |
| 2011/0164918 A1 * | 7/2011 | Cosentino | ................. | B64C 1/12 403/266 |
| 2012/0061003 A1 | 3/2012 | Bartholomeyzik et al. | | |
| 2012/0213574 A1 * | 8/2012 | Graf | ................. | G02B 27/0149 403/270 |
| 2013/0228979 A1 * | 9/2013 | Griffiths | ................. | F02F 7/00 277/591 |
| 2014/0023431 A1 * | 1/2014 | Hethcock | ................. | F16B 5/0266 403/265 |
| 2014/0178635 A1 * | 6/2014 | Imaizumi | ................. | B60J 1/007 428/138 |
| 2014/0265453 A1 * | 9/2014 | Hinz | ................. | B62D 25/06 296/210 |
| 2014/0328614 A1 * | 11/2014 | Fleischheuer | ................. | B60N 2/682 403/267 |
| 2015/0093185 A1 * | 4/2015 | Nonaka | ................. | B29C 65/562 403/267 |
| 2015/0284035 A1 * | 10/2015 | Reese | ................. | B62D 29/043 296/193.02 |
| 2015/0322993 A1 * | 11/2015 | Brewer | ................. | F16B 37/12 411/82 |
| 2015/0375796 A1 * | 12/2015 | Minei | ................. | B62D 27/026 296/29 |
| 2016/0059903 A1 * | 3/2016 | Anasenzl | ................. | B62D 27/026 296/187.01 |
| 2016/0138637 A1 * | 5/2016 | Kurokawa | ................. | F16B 5/045 411/82.1 |

FOREIGN PATENT DOCUMENTS

| | | | | |
|---|---|---|---|---|
| DE | 29707645 U1 * | 7/1997 | ............ | B62D 31/02 |
| DE | 19737966 A1 * | 8/1998 | ........... | B29C 65/562 |
| DE | 19800035 A1 * | 7/1999 | | |
| DE | 102005033351 A1 * | 1/2007 | ............ | B62D 25/16 |
| DE | 102005040403 A1 * | 3/2007 | ........... | B62D 29/048 |
| DE | 102006027765 A1 * | 12/2007 | ............ | B62D 25/00 |
| DE | 102008005286 A1 * | 6/2009 | ............ | B62D 25/06 |
| DE | 102011089237 A1 * | 6/2013 | ................. | C09J 5/00 |
| DE | 102013006031 A1 * | 10/2014 | ........... | F16B 11/006 |

(56) References Cited

FOREIGN PATENT DOCUMENTS

| | | | | | |
|---|---|---|---|---|---|
| DE | 102013007423 | A1 | * | 10/2014 | ............ F16B 11/006 |
| EP | 0240470 | A1 | * | 10/1987 | ............ B62D 29/001 |
| EP | 0317109 | A1 | * | 5/1989 | ............ B62D 29/001 |
| EP | 1232924 | A2 | * | 8/2002 | ............ B61D 17/043 |
| EP | 1296068 | A1 | * | 3/2003 | ............ B62D 27/026 |
| EP | 2546124 | A2 | * | 1/2013 | ............ B62D 27/026 |
| FR | 2687974 | A1 | * | 9/1993 | ............ B62D 21/10 |
| GB | 1237615 | A | * | 6/1971 | ............ B62D 21/00 |
| JP | 56135375 | A | * | 10/1981 | ............ B62D 65/06 |
| JP | 58224866 | A | * | 12/1983 | ............ B60R 22/18 |
| JP | 62194980 | A | * | 8/1987 | ............ B62D 25/06 |
| JP | S62-194980 | A | | 8/1987 | |
| JP | S63-150364 | A | | 6/1988 | |
| JP | H01-111575 | A | | 4/1989 | |
| JP | 03058836 | A | * | 3/1991 | ............ B62D 25/00 |
| JP | 04095585 | A | * | 3/1992 | |
| JP | H05-014950 | Y2 | | 4/1993 | |
| JP | 2001-206248 | A | | 7/2001 | |
| JP | 2004-130985 | A | | 4/2004 | |
| JP | 2004-130986 | A | | 4/2004 | |
| JP | 2004130986 | A | * | 4/2004 | ............ B62D 65/06 |
| JP | 2004276936 | A | * | 10/2004 | ............ B60R 22/18 |
| JP | 2005244103 | A | * | 9/2005 | |
| JP | 2006213129 | A | * | 8/2006 | ............ B62D 21/10 |
| JP | 2006233528 | A | * | 9/2006 | ............ B61D 17/043 |
| JP | 2007118852 | A | * | 5/2007 | ............ B62D 29/001 |
| JP | 2008143936 | A | * | 6/2008 | |
| JP | 2008-164061 | A | | 7/2008 | |
| JP | 2008189066 | A | * | 8/2008 | |
| JP | 2008302769 | A | * | 12/2008 | |
| JP | 2010083354 | A | * | 4/2010 | |
| JP | 2010143009 | A | * | 7/2010 | |
| JP | 2011105102 | A | * | 6/2011 | |
| JP | 2012-001142 | A | | 1/2012 | |
| JP | 2013095372 | A | * | 5/2013 | |
| JP | 2013-208861 | A | | 10/2013 | |
| JP | 2015030355 | A | * | 2/2015 | ............ F16B 11/006 |
| SU | 1756670 | A1 | * | 8/1992 | |
| WO | 01/58740 | A1 | | 8/2001 | |
| WO | WO-2010003549 | A2 | * | 1/2010 | ............ B60R 13/06 |
| WO | WO-2014044536 | A1 | * | 3/2014 | ............ B61D 17/04 |
| WO | 2015/008589 | A1 | | 1/2015 | |

OTHER PUBLICATIONS

Machine Translation of DE 3601262 A1, Jul. 1987 (Year: 1987).*
Machine Translation of JP 04095585 A, Mar. 1992 (Year: 1992).*
Machine Translation of DE 19800035 A1, Jul. 1999 (Year: 1999).*
Machine Translation of JP 2013095372 A, May 2013 (Year: 2013).*
Sika Services Ag et al., Elastic Bonding, Jun. 2006 (Year: 2006).*
Toray Industries Inc. et al. "Research and Development of Composite Materials for Reduction in Weight of Automobiles and Strengthening of Carbon Fibers". New Technology Program for Global Warming Prevention 2003-2007. Commissioned by the New Energy and Industrial Technology Development Organization. Progress Report. p. 368-393 and p. 473-481, May 2008.
Lobtex Fastening Systems Ltd. Product Guide, Advanced Fastening Systems. vol. 2. 2014.

\* cited by examiner

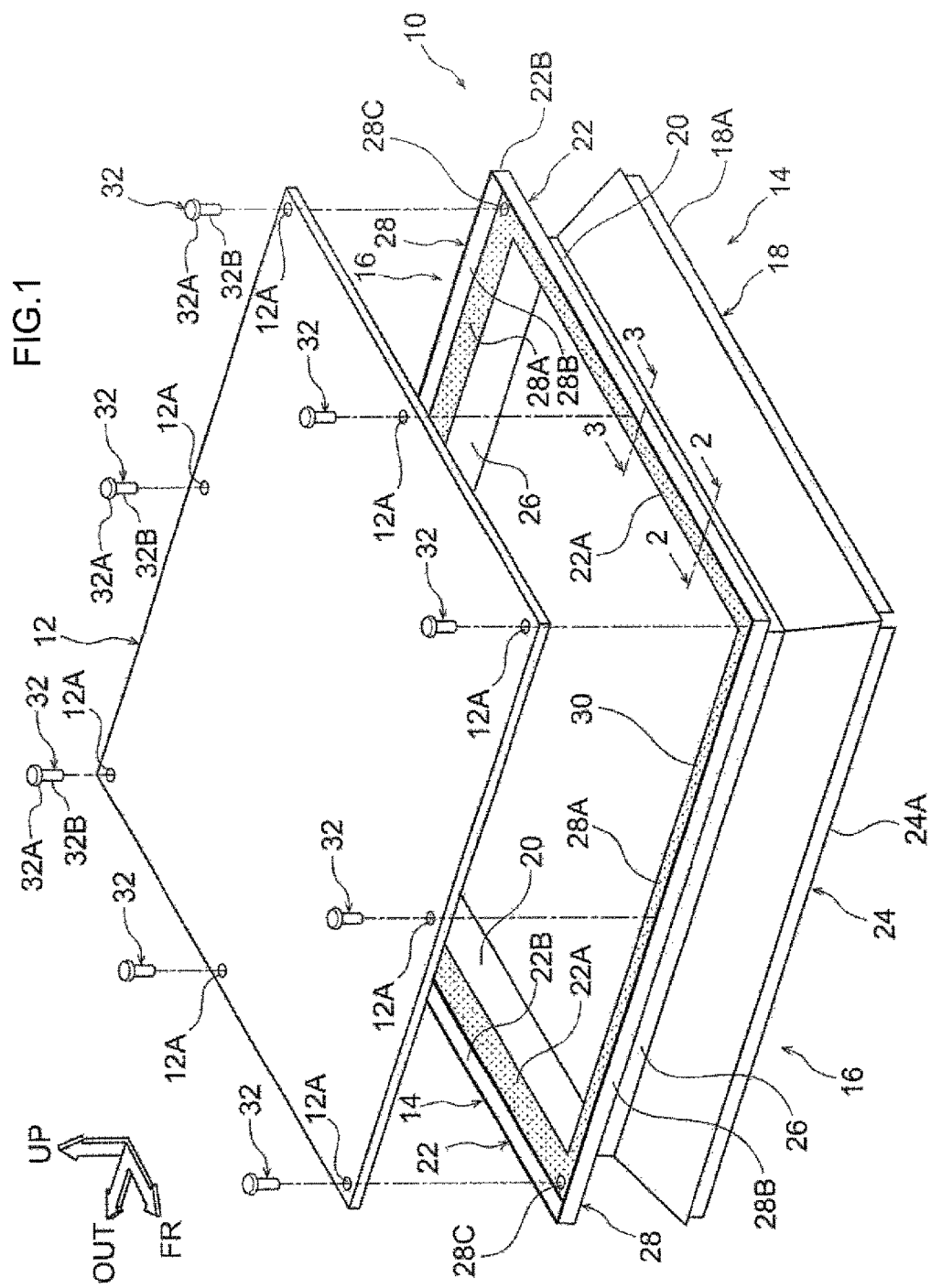

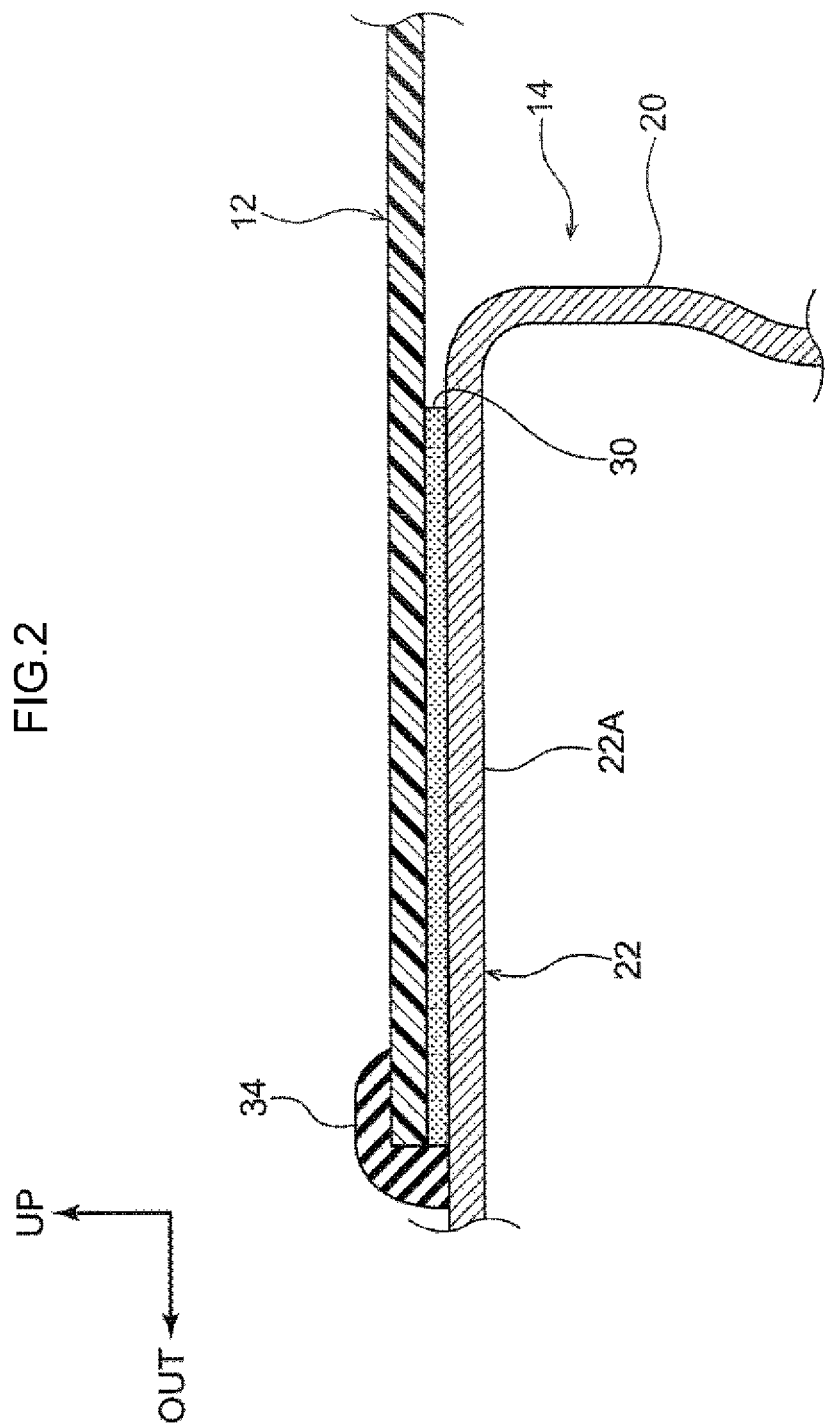

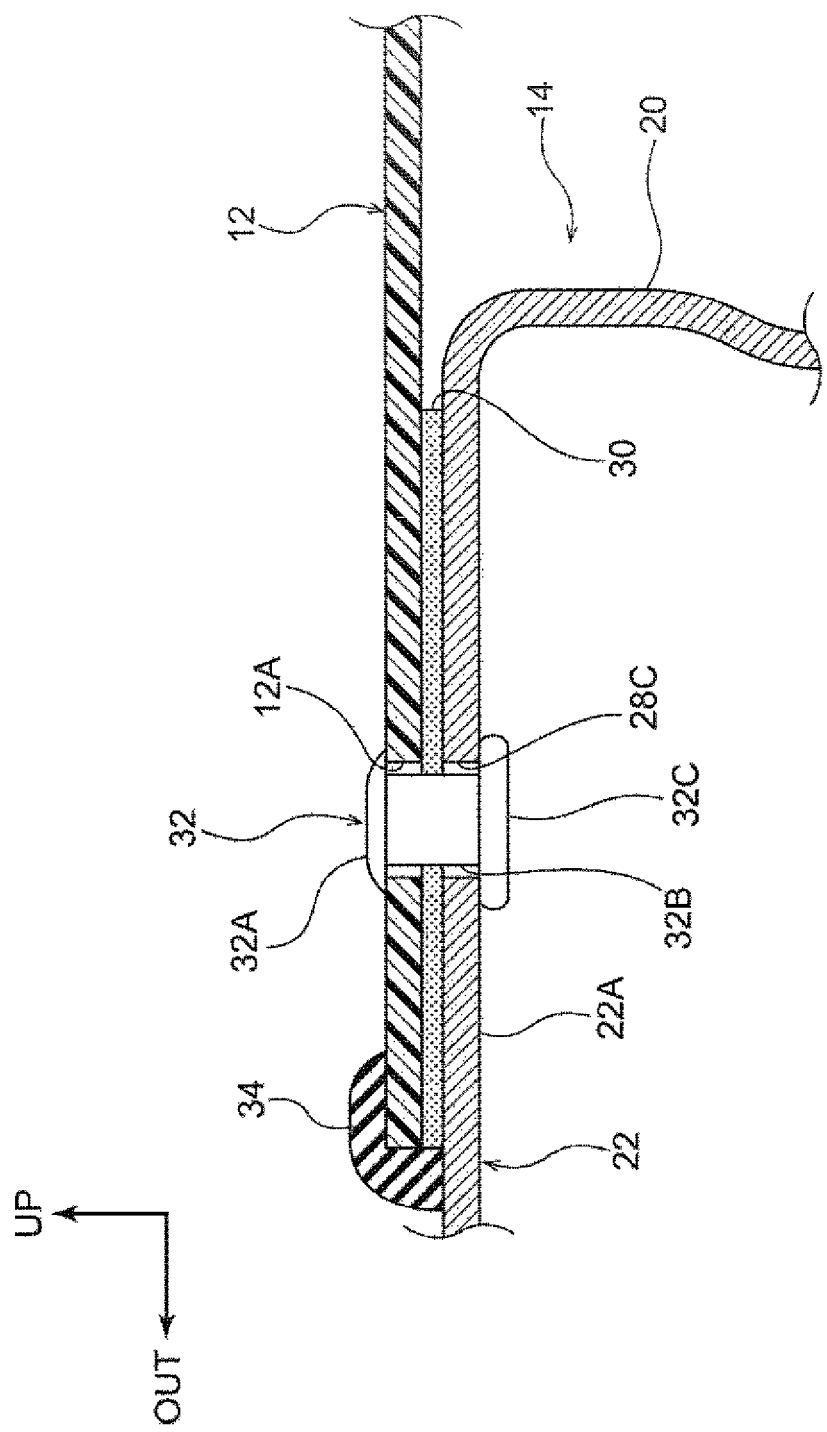

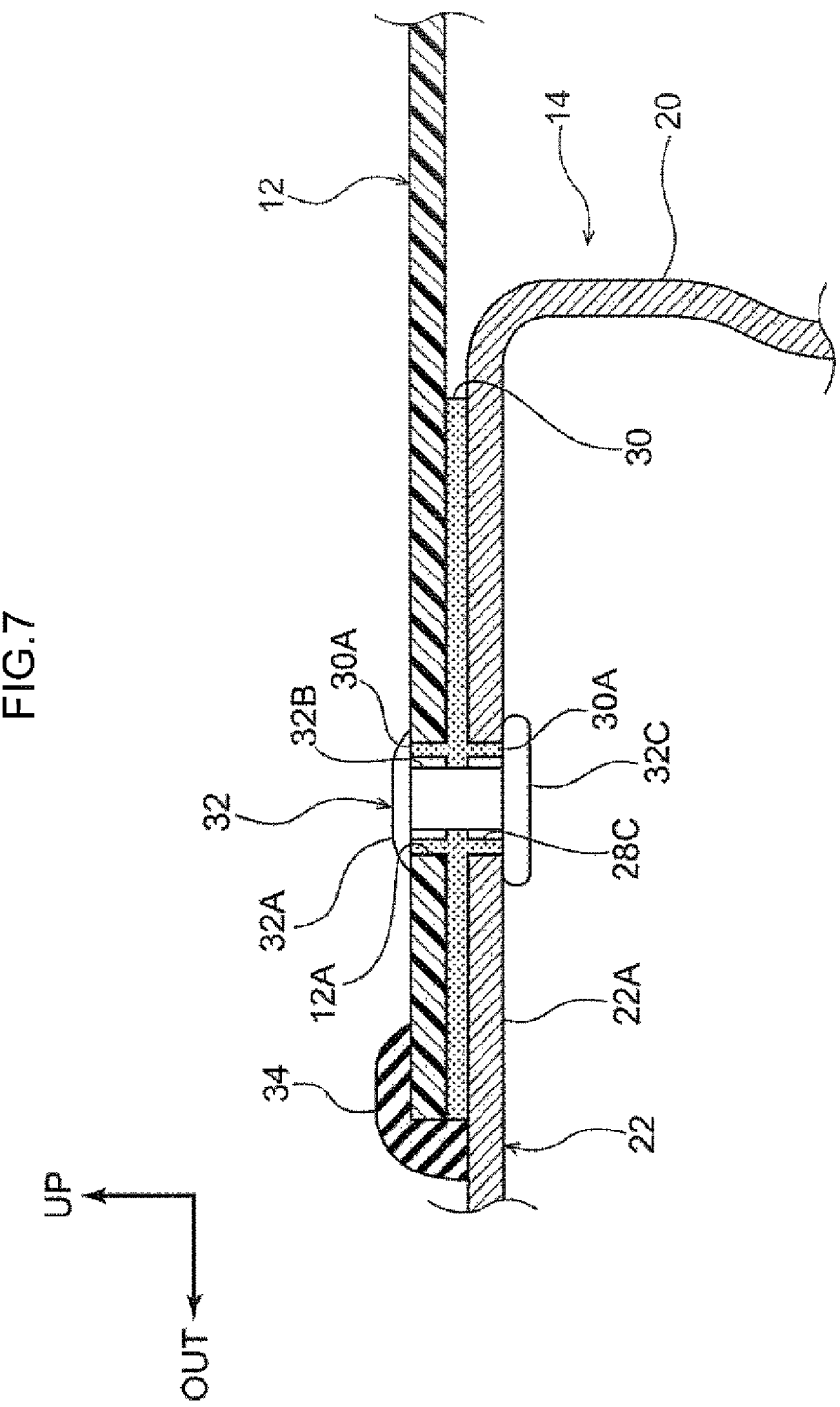

VEHICLE MEMBER JOINING STRUCTURE AND VEHICLE MEMBER JOINING METHOD

CROSS-REFERENCE TO RELATED APPLICATION

This application claims priority under 35 USC 119 from Japanese Patent Application No. 2015-107368 filed May 27, 2015, the entire disclosure of which is incorporated by reference herein.

BACKGROUND

Technical Field

The disclosure relates to a vehicle member joining structure and a vehicle member joining method.

Related Art

Japanese Patent Application Laid-Open (JP-A) No. 2013-208861 discloses, as a joining structure that joins a member made of metal (a metal member) and a member made of resin (a resin member), a structure in which a frame member that is made of metal and an FRP plate that is made of CFRP (a carbon fiber reinforced resin composite material) are fastened together by bolts. Further, the technique is disclosed in which a reinforcing plate that is made of metal is joined by an adhesive onto the FRP plate, and the joining strength is adjusted by changing the surface area of adhesion between the reinforcing plate and the FRP plate. On the other hand, JP-A No. 2004-130986 discloses a structure in which a roof panel that is made of an aluminum alloy is joined, via a resin layer, onto a side member outer panel that is made of steel. Further, the technique is disclosed in which the thermal strain, that arises at the joined portion at the time of heating in the processes of manufacturing the vehicle, is mitigated by using, as the resin layer, a resin layer whose tensile shear strength is less than or equal to 2 MPa.

SUMMARY

However, the technique disclosed in JP-A No. 2013-208861 does not consider the difference in linear expansions (the difference in the linear expansion of the frame member and the linear expansion of the FRP plate) at the time of heating in the manufacturing processes of the vehicle or the like. Therefore, there is the possibility that thermal strain may occur at the joined portion of the frame member and the FRP plate due to the difference in linear expansions. On the other hand, in the technique disclosed in JP-A No. 2004-130986, merely the tensile shear strength of the resin layer is set, and therefore, there is the possibility that the adhesive may peel in a case in which the difference in the linear expansions of the steel side member outer panel and the roof panel is large.

In consideration of the above-described circumstances, an object of preferred embodiments is to provide a vehicle member joining structure and a vehicle member joining method that, in a structure in which a metal member and a resin member are joined by an adhesive, can maintain the joined state of the metal member and the resin member at the time of heating, while suppressing thermal strain that is due to the difference in the linear expansions of the metal member and the resin member.

A vehicle member joining structure relating to a first aspect has: a metal member that is part of a vehicle; a resin member that is adjacent to the metal member; and an adhesive that is provided between the metal member and the resin member and joins the metal member to the resin member, the adhesive having an elastic modulus that is lower than elastic moduli of the metal member and the resin member, wherein, given that (i) ΔL is a difference in linear expansions of the metal member and the resin member at a time of heating in a drying process after application of the adhesive, (ii) $T_0$ is a thickness of the adhesive and (iii) $T_1$ is a length of an end surface of the adhesive, the following relational expression is satisfied:

$$T_1^2 = T_0^2 + \Delta L^2.$$

In the vehicle member joining structure relating to the first aspect, the adhesive is provided between and joins the metal member and the resin member. Here, the elastic modulus of the adhesive is lower than the elastic modulus of the metal member and the elastic modulus of the resin member. Therefore, when the metal member and the resin member are heated, the adhesive elastically deforms in accordance with the difference in linear expansions of the metal member and the resin member, and thermal strain due to the difference in linear expansions can be suppressed.

Further, at the time of heating in a drying process after coating, the adhesive stretches in accordance with the relative displacement between the metal member and the resin member, so as to satisfy the above relational expression. Thus, at the time when the metal member and the resin member are heated, the adhesive stretches in accordance with the relative displacement that is due to the difference in linear expansions of the metal member and the resin member. Due thereto, peeling of the adhesive at the time of heating can be suppressed, and the joined state of the metal member and the resin member at the time of heating can be maintained.

A vehicle member joining structure relating to a second aspect includes the first aspect, wherein a first through-hole is formed in the metal member, and a second through-hole is formed in the resin member coaxially with the first through-hole, and a fastening member that fastens the metal member and the resin member together is inserted through the first through-hole and the second through-hole, and a gap between a shaft of the fastening member and an inner periphery of at least one of the first through-hole and the second-through hole is larger than the difference in linear expansions of the metal member and the resin member at the time of heating in the drying process.

In the vehicle member joining structure relating to the second aspect, the metal member and the resin member are joined by the adhesive and are fastened together by the fastening member. Due thereto, the joining strength can be improved as compared with a structure in which the metal member and the resin member are joined only by an adhesive.

Further, the gap between the fastening member and at least one of the first through-hole and the second through-hole is larger than the difference in linear expansions. Therefore, even in a case in which, at the time of heating, the metal member and the resin member are displaced relatively due to the difference in linear expansions, the gap between the first-through hole and the fastening member, or the gap between the second-through hole and the fastening member, becomes a relief portion. As a result, thermal strain can be suppressed.

A vehicle member joining structure relating to a third aspect includes the second aspect, wherein the fastening member has (1) a first head that extends along the resin member from one end of the shaft and anchors on the resin member, and (2) a second head that extends along the metal member from another end of the shaft and anchors on the metal member. In addition, a surface area of a first region at which the metal member and the second head overlap as seen from an axial direction of the fastening member is larger than a surface area of a second region at which the resin member and the first head overlap as seen from the axial direction of the fastening member.

In the vehicle member joining structure relating to the third aspect, the contact surface area between the metal member and the second head portion is greater than the contact surface area between the resin member and the first head portion. Here, because the fastening force of the fastening member depends on the contact surface area with the metal member, the fastening force of the fastening member can be improved by making the contact surface area between the metal member and the second head portion large.

A vehicle member joining structure relating to a fourth aspect includes the third aspect, wherein the adhesive is provided between the shaft and the metal member and between the shaft and the resin member.

In the vehicle member joining structure relating to the fourth aspect, the adhesive is interposed between, on the one hand, the metal member and the resin member, and, on the other hand, the fastening member. Due thereto, the metal member and the resin member can be suppressed from contacting the fastening member. As a result, even in a case in which the fastening member is formed of metal, electric corrosion of the metal member and the resin member can be suppressed.

A vehicle member joining method relating to a fifth aspect includes: applying, to at least one of a metal member and a resin member, an adhesive having an elastic modulus that is lower than elastic moduli of the metal member and the resin member and that stretches in accordance with relative displacement of the metal member and the resin member that is due to a difference in linear expansions of the metal member and the resin member at a time of heating in a drying process after applying the adhesive; superposing and joining the metal member and the resin member by the adhesive in a state in which a first through-hole that is formed in the metal member and a second through-hole that is formed in the resin member are made to face one another; and inserting a fastening member through the first through-hole and the second through-hole, and fastening the metal member and the resin member together with the fastening member.

In the vehicle member joining method relating to the fifth aspect, the adhesive is applied to at least one of the metal member and the resin member. Further, the metal member and the resin member are joined by the adhesive. Moreover, the fastening member is inserted-through the first through-hole and the second through-hole, and fastens the metal member and the resin member together. Here, an adhesive, having an elastic modulus that is lower than the elastic moduli of the metal member and the resin member and that stretches in accordance with the relative displacement that arises due to the difference in linear expansions of the metal member and the resin member at the time of heating in a drying process after coating, is used as the adhesive. Due thereto, thermal strain due to the difference in linear expansions of the metal member and the resin member can be suppressed. Further, at the time when the metal member and the resin member are heated, the adhesive stretches in accordance with the relative displacement that is due to the difference in linear expansions of the metal member and the resin member. Due thereto, peeling of the adhesive at the time of heating can be suppressed.

As described above, the vehicle member joining structure relating to the first aspect has the excellent effect of, in a structure in which a metal member and a resin member are joined by an adhesive, being able to maintain the joined state of the metal member and the resin member at the time of heating, while suppressing thermal strain that is due to the difference in the linear expansions of the metal member and the resin member.

The vehicle member joining structure relating to the second aspect has the excellent effect of being able to improve the joining strength of the metal member and the resin member, while suppressing thermal strain.

The vehicle member joining structure relating to the third aspect has the excellent effect of being able to improve the fastening force of the fastening member.

The vehicle member joining structure relating to the fourth aspect has the excellent effect of being able to suppress electric corrosion of the metal member and the resin member.

The vehicle member joining method relating to the fifth aspect has the excellent effect of being able to maintain the joined state of the metal member and the resin member at the time of heating, while suppressing thermal strain that is due to the difference in the linear expansions of the metal member and the resin member.

BRIEF DESCRIPTION OF THE DRAWINGS

Example embodiments will be described in detail based on the following figures, wherein:

FIG. 1 is a perspective view showing vehicle members relating to an embodiment;

FIG. 2 is a cross-sectional view showing, in an enlarged manner, the state cut along line 2-2 of FIG. 1;

FIG. 3 is a cross-sectional view showing, in an enlarged manner, the state cut along line 3-3 of FIG. 1;

FIG. 7 is a drawing corresponding to FIG. 3 and showing a first modified example of the vehicle members relating to the embodiment.

DETAILED DESCRIPTION

Figure 4A:
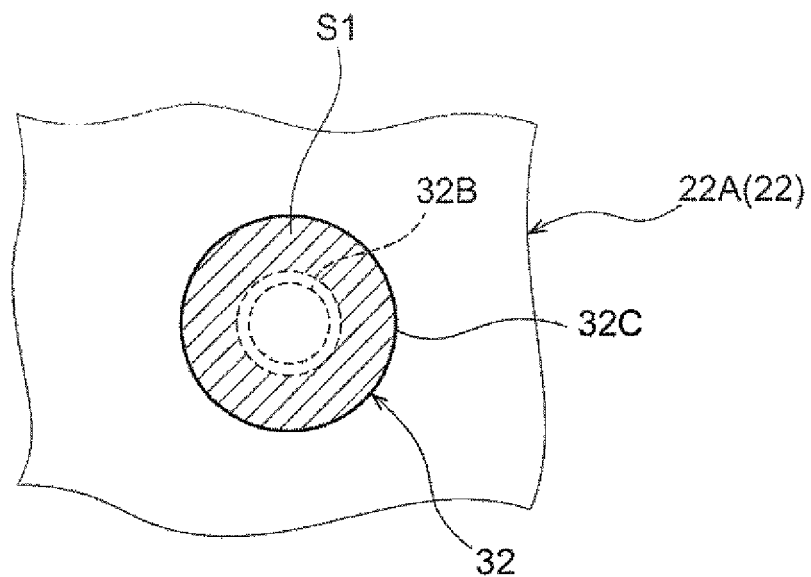
FIG. 4A is a drawing in which a rivet in FIG. 3 is seen from a rocker inner side.

An embodiment of a vehicle member joining structure is described hereinafter with reference to the drawings. Note that arrow FR that is shown appropriately in the respective drawings indicates the vehicle front side of a vehicle in which vehicle members are assembled, arrow UP indicates the vehicle upper side, and arrow OUT indicates a vehicle transverse direction outer side. Further, in the following description, when longitudinal, vertical, and left and right directions are used without being specified, they respectively indicate the vehicle longitudinal direction, the vehicle vertical direction, and the left and right directions when facing in the advancing (forward-moving) direction.

(Vehicle Member Joining Structure)

As shown in FIG. 1, the vehicle members are structured to include a metal frame 10 that serves as a metal member and that is formed in a substantially rectangular frame shape as seen in plan view, and a resin panel 12 that serves as a resin member and that is assembled to the metal frame 10 from the vehicle upper side. The metal frame 10 is a member that structures a vehicle member, and has a pair of left and right rocker inners 14 that extend in the vehicle longitudinal direction, and cross member inners 16 that connect the rocker inners 14 in the vehicle transverse direction.

The rocker inner 14 is a member that is made of metal, and is structured to include a panel mounting portion 22 that is substantially L-shaped in cross-section and that is positioned at the upper portion, an inclined portion 18 that is positioned at the lower portion, and a vertical wall portion 20 that is positioned between the panel mounting portion 22 and the inclined portion 18 and connects the both.

The inclined portion 18 is inclined toward the vehicle transverse direction outer side while heading from the upper side toward the lower side. Further, a lower flange portion 18A extends-out toward the vehicle lower side from the lower end portion of the inclined portion 18. The lower flange portion 18A extends out toward the vehicle lower side from a region other than the front end portion and the rear end portion of the inclined portion 18, and is joined to an unillustrated rocker outer.

The vertical wall portion 20 is provided at the upper end portion of the inclined portion 18. The length, in the vehicle longitudinal direction, of the vertical wall portion 20 is formed to be substantially the same length as that of the upper end portion of the inclined portion 18, and the vertical wall portion 20 extends-out toward the vehicle upper side from the inclined portion 18. Further, the vertical wall portion 20 of the one rocker inner 14 and the vertical wall portion 20 of the other rocker inner 14 are substantially parallel.

The panel mounting portion 22 is provided at the upper end portion of the vertical wall portion 20. The panel mounting portion 22 has a horizontal portion 22A that extends toward the vehicle transverse direction outer side from the upper end portion of the vertical wall portion 20. Further, an upper flange portion 22B extends-out toward the vehicle upper side from the vehicle transverse direction outer side end portion of the horizontal portion 22A. This upper flange portion 22B is joined to the unillustrated rocker outer.

The rocker inner 14 is structured as described above, and the cross-sectional shape thereof, as seen from the vehicle front side, is formed in a substantial hat shape that opens toward the vehicle transverse direction outer side. The unillustrated rocker outer, that in cross-section is a substantial hat shape that opens toward the vehicle transverse direction inner side, is joined to the vehicle transverse direction outer side of the rocker inner 14. Concretely, the upper flange portion 22B of the rocker inner 14 is joined to an upper flange of the rocker outer, and the lower flange portion 18A of the rocker inner 14 is joined to a lower flange of the rocker outer. The rocker that has a closed cross-section (defining an enclosed chamber) is thereby structured.

Here, the pair of left and right rocker inners 14 are disposed substantially parallel, and the front end portions of these rocker inners are connected together by the cross member inner 16. Further, the rear end portions of the rocker inners 14 as well are connected together by the cross member inner 16 that is similar. In the following description, details of the cross member inner 16 at the front side are described, but the cross member inner 16 at the rear side has a similar structure.

The cross member inner 16, that connects the front end portions of the rocker inners 14 together, is a member that is made of metal. Further, the cross member inner 16 is structured to include a panel mounting portion 28 that is substantially L-shaped in cross-section and is positioned at the upper portion, an inclined portion 24 that is positioned at the lower portion, and a vertical wall portion 26 that is positioned between the panel mounting portion 28 and the inclined portion 24 and connects the both.

The inclined portion 24 is inclined toward the vehicle front side while heading from the upper side toward the lower side. Further, a lower flange portion 24A extends-out toward the vehicle lower side from the lower end portion of the inclined portion 24. The lower flange portion 24A extends-out toward the vehicle lower side from a region other than the vehicle transverse direction both sides end portion of the inclined portion 24, and is joined to an unillustrated cross member outer.

The vertical wall portion 26 is provided at the upper end portion of the inclined portion 24. The vertical wall portion 26 is formed to substantially the same length as the upper end portion of the inclined portion 24 in the vehicle transverse direction, and extends-out toward the vehicle upper side from the inclined portion 24. Further, the vertical wall portion 26 of the one cross member inner 16 and the vertical wall portion 26 of the other cross member inner 16 are substantially parallel.

The panel mounting portion 28 is provided at the upper end portion of the vertical wall portion 26. The panel mounting portion 28 has a horizontal portion 28A that extends toward the vehicle front side from the upper end portion of the vertical wall portion 26. An upper flange portion 28B extends-out toward the vehicle upper side from the vehicle front side end portion of this horizontal portion 28A. This upper flange portion 28B is joined to an unillustrated cross member outer.

The cross member inner 16 is structured as described above, and the cross-sectional shape thereof, as seen from the vehicle transverse direction, is formed in a substantial hat shape that opens toward the vehicle front side. An unillustrated cross member outer, that in cross-section is a substantial hat shape that opens toward the vehicle rear side, is joined to the vehicle front side of the cross member inner 16. Concretely, the upper flange portion 28B of the cross member inner 16 is joined to an upper flange of the cross member outer, and the lower flange portion 24A of the cross member inner 16 is joined to a lower flange of the cross member outer. The cross member that has a closed cross-section is thereby structured.

Further, the vehicle right side end portion of the cross member inner 16 is joined by welding or the like to the rocker inner 14 that is disposed at the vehicle right side. The vehicle left side end portion of the cross member inner 16 is joined by welding or the like to the rocker inner 14 that is positioned at the vehicle left side.

Note that the cross member inner 16, that connects the rear end portions of the rocker inners 14 together, is formed in a substantial hat shape whose vehicle rear side is open, and is joined to the pair of left and right rocker inners 14 respectively by welding or the like. The metal frame 10 that is frame-shaped is thereby structured.

Here, the panel mounting portions 22 of the rocker inners 14 and the panel mounting portions 28 of the cross member inners 16 are formed integrally in the shape of a frame. Further, the horizontal portions 22A of the panel mounting portions 22 and the horizontal portions 28A of the panel mounting portions 28 structure a continuous flat surface, and an adhesive 30 is applied on this flat surface. Details of the adhesive 30 are described later.

Through-holes (first through-holes) 28C are formed in horizontal portions 22A and the horizontal portions 28A. When the horizontal portions 22A and the horizontal portions 28A are considered to be a continuous, rectangular frame-shaped surface, the through-holes 28C are formed at the four corners of this surface and at the intermediate portions of the four sides, respectively. Therefore, eight of the through-holes 28C are formed in the horizontal portions 22A and the horizontal portions 28A. (In FIG. 1, only two of the through-holes 28C that are on a diagonal are shown.)

Here, the resin panel 12 is joined from the vehicle upper side of the metal frame 10. The resin panel 12 is formed of resin, and, as an example in the present embodiment, is formed of CFRP (a carbon fiber reinforced resin composite material). Further, the resin panel 12 is formed in the shape of a plate that is substantially rectangular as seen in plan view.

Moreover, through-holes (second through-holes) 12A that pass-through in the plate thickness direction are formed in the four corners of the resin panel 12. Further, the through-holes 12A are formed also in the intermediate portions of the four sides of the resin panel 12, respectively. Therefore, eight of the through-holes 12A are formed in the resin panel 12. The resin panel 12 is joined to the horizontal portions 22A and the horizontal portions 28A via the adhesive 30. Further, rivets 32 serving as fastening members are inserted-through the through-holes 28C that are formed in the horizontal portions 22A and the horizontal portions 28A, and the through-holes 12A that are formed in the resin panel 12, and the resin panel 12 and the metal frame 10 are mechanically fastened together by these rivets 32. Details of the rivets 32 are described later.

A cross-sectional view, in which the joined portion of the resin panel 12 and the rocker inner 14 is enlarged, is shown in FIG. 2. The structure of this joined portion of the resin panel 12 and the rocker inner 14 is described hereinafter. Note that, because the joined portion of the resin panel 12 and the cross member inner 16 has a structure similar to that of FIG. 2, description thereof is omitted.

The adhesive 30 is provided between the panel mounting portion 22 of the rocker inner 14 and the resin panel 12, and joins them together. The adhesive 30 is provided continuously at the region from the outer peripheral end portion of the resin panel 12 to the rear end portion of the horizontal portion 22A, and the panel mounting portion 22 and the resin panel 12 planarly contact each other.

Here, the outer peripheral end portion of the resin panel 12 is covered by a sealer 34. The sealer 34 is provided continuously along the outer peripheral end portions of the resin panel 12. Due thereto, penetration of moisture from between the resin panel 12 and the panel mounting portion 22 is prevented. In this way, electric corrosion due to the corrosion potential difference of the resin panel 12 and the panel mounting portion 22 is prevented. Further, similarly, electric corrosion due to the corrosion potential difference of the resin panel 12 and the panel mounting portion 28 of the cross member inner 16 is prevented.

Here, in the present embodiment, an epoxy one-liquid thermally curable adhesive is used as the adhesive 30. Further, as the curing conditions, the temperature is set to 170° C. and the time is set to 20 minutes. Moreover, an adhesive whose shear strength is set to 1 to 5 MPa is used. Note that the adhesive 30 is not limited to this, and another adhesive may be used. For example, a urethane or elastomer adhesive may be used, or a modified silicone adhesive may be used. Further, the curing type may be a two-liquid thermally curable type or a normal temperature curable type, or may be a moisture curable type. Moreover, the curing conditions may be changed in accordance with the adhesive. For example, in the case of a normal temperature curable adhesive, the temperature may be set to 20° C. and the time may be set to one day.

Further, the adhesive 30 has the features that the elastic modulus thereof is lower than those of the rocker inners 14 and the resin panel 12, and that, at the time of heating in a drying process after coating, the adhesive 30 stretches in accordance with the relative displacement that arises due to the difference in linear expansions of the rocker inners 14 (the metal frame 10) and the resin panel 12. Therefore, at a time of being heated to a predetermined temperature (e.g., 150° C. to 200° C.) in the drying processing after coating, even in a case in which the resin panel 12 and the horizontal portions 22A are displaced relatively due to the difference in the linear expansions thereof, the adhesive 30 elastically deforms, and, by stretching, can suppress thermal strain. Note that, although the elastic modulus is made to be 100 MPa in the present embodiment, the adhesive is not limited to this, and an adhesive having an even lower elastic modulus may be used, and an adhesive having an elastic modulus of 1 MPa may be used. Further, in the present embodiment, an adhesive having a heat-resistant temperature of greater than or equal to 215° C. is used as the adhesive 30. However, the adhesive is not limited to this, and an adhesive whose heat-resistant temperature is lower than 215° C. may be used as the adhesive provided that the heat-resistant temperature thereof is higher than the temperature of the drying furnace after coating.

Figure 5:
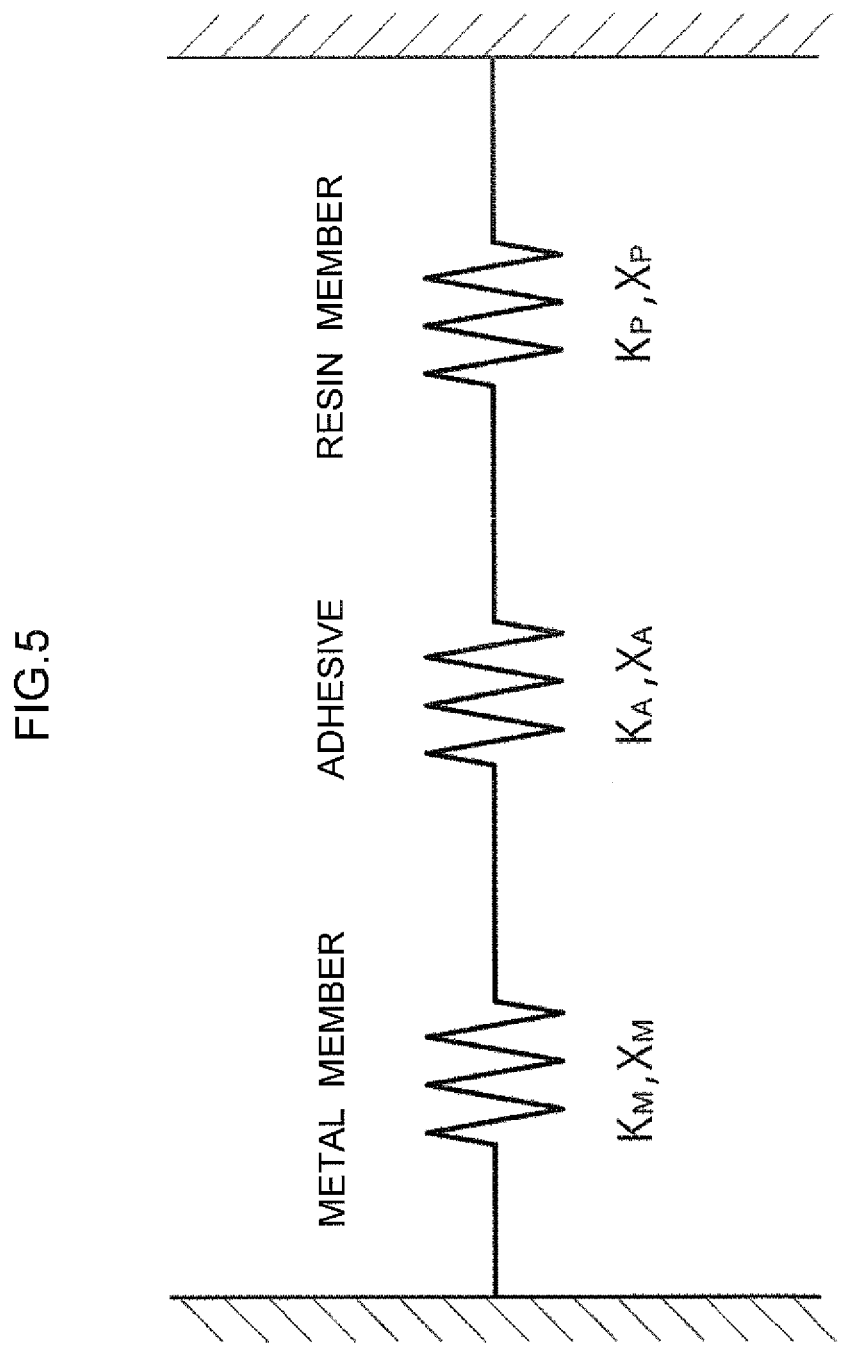
FIG. 5 is a drawing showing a vibration model in which a metal member and a resin member are joined by an adhesive.

Preferable conditions of the adhesive 30 that can suppress thermal strain are considered here. First, the elastic modulus of the adhesive 30 is considered on the basis of the vibration model shown in FIG. 5. Note that $K_M$ and $X_M$ in the drawing respectively are the spring constant (the elastic modulus) of the metal member and the amount of displacement at the time of heating of the metal member. Further, $K_A$ and $X_A$ in the drawing respectively are the spring constant (the elastic modulus) of the adhesive and the amount of displacement at the time of heating of the adhesive. Moreover, $K_P$ and $X_P$ in the drawing respectively are the spring constant (the elastic modulus) of the resin member and the amount of displacement at the time of heating of the resin member.

Given that the force that is applied at the time of heating is F and the difference in linear expansions is ΔL, F and ΔL are expressed by following formula (1) and formula (2) by using the above-described parameters.

[Mathematical Expression 1]

$$F = K_M X_M = K_A X_A = K_P X_P \quad (1)$$

[Mathematical Expression 2]

$$\Delta L = X_M + X_A X_P \quad (2)$$

Following formula (3) results when formula (1) is substituted into formula (2).

[Mathematical Expression 3]

$$\Delta L = X_A \left( \frac{K_A}{K_M} + 1 + \frac{K_A}{K_P} \right) \quad (3)$$

Here, it is preferable that the expression $\Delta L \approx X_A$ be satisfied in order to absorb, at the adhesive, the difference $\Delta L$ in linear expansions. Namely, from above formula (3), it can be understood that, if

[Mathematical Expression 4]

$$\frac{K_A}{K_M} \approx 0, \frac{K_A}{K_P} \approx 0 \quad (4)$$

the adhesive elastically deforms and can effectively absorb the difference $\Delta L$ in linear expansions. Namely, it is preferable that the spring constant $K_A$ of the adhesive be made to be extremely smaller than the spring constant $K_M$ of the metal member and the spring constant $K_P$ of the resin member. In other words, it is preferable to make the elastic modulus of the adhesive be extremely lower than the elastic modulus of the metal member and the elastic modulus of the resin member. The adhesive 30 relating to the present embodiment is made to have an elastic modulus (100 MPa) that is less than or equal to 1/1000 of the elastic modulus of the metal frame 10 and the elastic modulus of the resin panel 12.

Figure 6A:
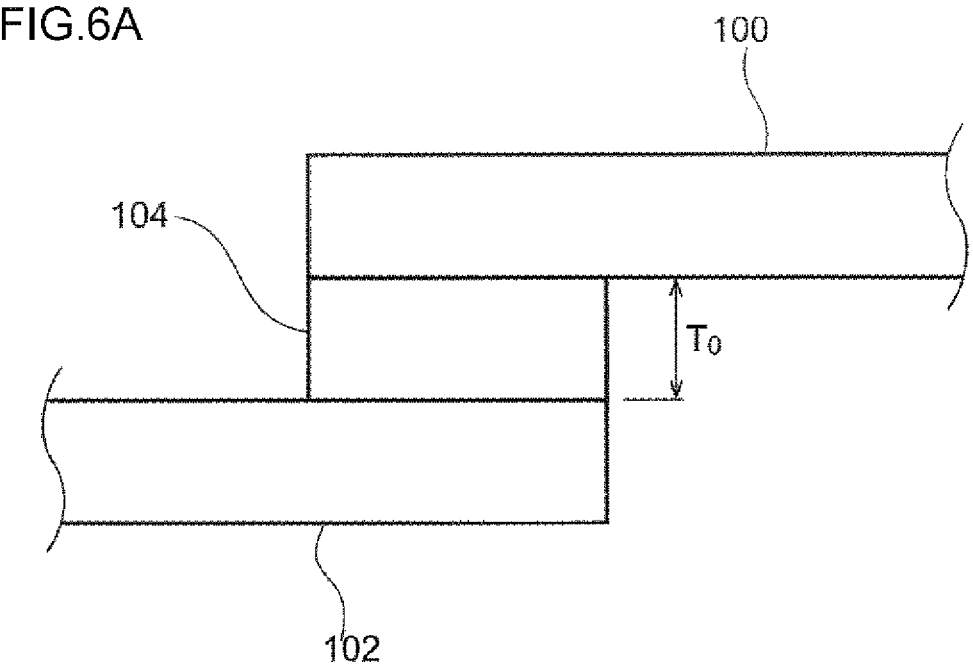
FIG. 6A is a drawing showing a state, before heating, of a model for computing the rate of elongation required of the adhesive.
Figure 6B:
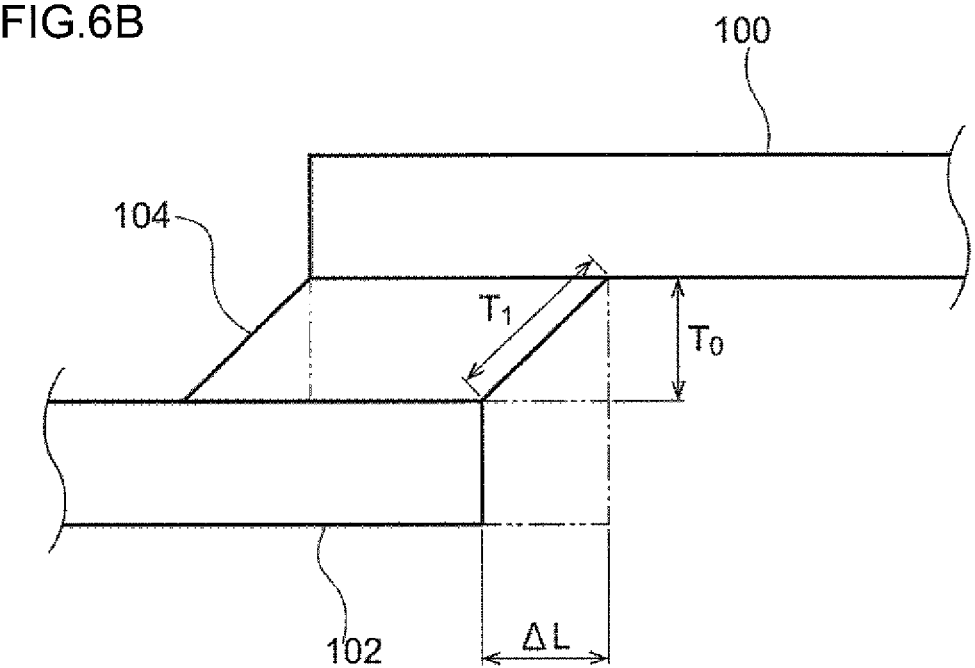
FIG. 6B is a drawing showing a state, at a time of heating, of the model for computing the rate of elongation required of the adhesive.

The rate of elongation that is required of the adhesive is considered next with reference to the model drawing of FIGS. 6A-6B. Here, FIGS. 6A and 6B shows states before and after heating of model drawings in which a metal plate 102 and a resin plate 100 are joined by an adhesive 104. Further, although the heating temperature is not particularly limited, a temperature (e.g., 180° C.) in the drying process after coating at a vehicle is assumed in the present embodiment. Note that, for convenience of explanation, the thickness of the adhesive 104 is drawn in an exaggerated manner.

As shown in FIG. 6A, in the state before heating, an end surface of the metal plate 102 and one end surface of the adhesive 104 are continuous, and an end surface of the resin plate 100 and the other end surface of the adhesive 104 are continuous. Further, the thickness of the adhesive 104 is $T_0$.

As shown in FIG. 6B, at the time of heating, the metal plate 102 and the resin plate 100 are displaced relatively by $\Delta L$ in the direction orthogonal to the thickness direction, due to the difference in linear expansions of the metal plate 102 and the resin plate 100. Further, the adhesive 104 elastically deforms in accordance with the relative displacement between the metal plate 102 and the resin plate 100, and stretches.

Here, the thickness of the adhesive 104 (the thickness in the direction orthogonal to the adhesion surfaces) is $T_0$ that is the same as in the state before heating. Further, given that the length in the direction heading from the metal plate 102 to the resin plate 100 at the end surface of the adhesive 104 is the length of the end surface, the length of the end surface of the adhesive 104 is $T_1$. Due thereto, following formula (5) is established.

[Mathematical Expression 5]

$$T_1^2 = T_0^2 + \Delta L^2 \quad (5)$$

From above formula (5), the rate of elongation at the time of heating that is required of the adhesive 104 is as per following formula (6).

[Mathematical Expression 6]

$$\frac{T_1}{T_0} = \sqrt{1 + \left(\frac{\Delta L}{T_0}\right)^2} \quad (6)$$

From the above, it is preferable to use an adhesive having a rate of elongation that satisfies $\Delta L \approx X_A$ in above formula (2). Further, an adhesive having a rate of elongation that satisfies above formula (6) is used.

The rivets 32 are described next. As shown in FIG. 3, the through-hole 12A that is formed in the resin panel 12 is formed coaxially with the through-hole 28C that is formed in the panel mounting portion 22 of the rocker inner 14. Namely, the through-hole 12A and the through-hole 28C are provided at positions facing one another in the vehicle vertical direction. Further, in the present embodiment, as an example, the through-hole 12A and the through-hole 28C are formed to substantially the same diameter. The rivet 32 is inserted-through the through-hole 12A and the through-hole 28C.

In the state after fastening, the rivet 32 has a shaft portion 32B, a first head portion 32A, and a second head portion 32C. The shaft portion 32B is formed substantially in the shape of a solid cylinder whose axial direction is the vehicle vertical direction, and is inserted-through the resin panel 12 and the horizontal portion 22A. Further, the first head portion 32A is provided at the upper end portion of the shaft portion 32B, and is formed substantially in the shape of a flat truncated cone whose diameter is larger than that of the shaft portion 32B. The lower surface of the peripheral end portion of the first head portion 32A abuts the top surface of the resin panel 12, and the resin panel 12 is anchored by this first head portion 32A.

On the other hand, the second head portion 32C is provided at the lower end portion of the shaft portion 32B, and is formed substantially in the shape of a circular plate having a larger diameter than the shaft portion 32B. Further, the second head portion 32C has a larger diameter than the first head portion 32A. The upper surface of the peripheral end portion of the second head portion 32C abuts the bottom surface of the horizontal portion 22A, and the panel mounting portion 22 is anchored by this second head portion 32C.

Further, in the present embodiment, the gap between the shaft portion 32B and the through-hole 12A that is formed in the resin panel 12 is formed to be substantially the same size as the gap between the shaft portion 32B and the through-hole 28C that is formed in the panel mounting portion 22 of the rocker inner 14. These gaps are formed to be larger than the difference in linear expansions of the resin panel 12 and the panel mounting portion 22 (the rocker inner 14).

Figure 4B:
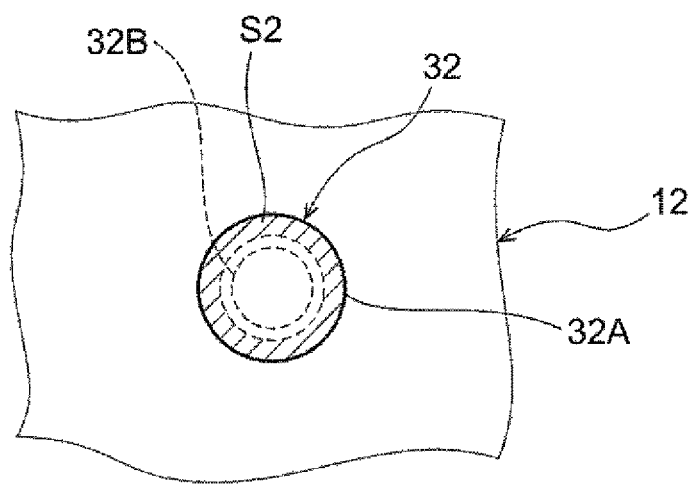
FIG. 4B is a drawing in which the rivet in FIG. 3 is seen from a resin panel side.

Moreover, as shown in FIGS. 4A-4B, surface area S1 of the region (the region marked by hatching in FIG. 4A) at which the horizontal portion 22A of the panel mounting portion 22 and the second head portion 32C overlap as seen from the axial direction of the rivet 32, is larger than surface area S2 of the region (the region marked by hatching in FIG. 4B) at which the resin panel 12 and the first head portion 32A overlap as seen from the axial direction of the rivet 32.

(Vehicle Member Joining Method)

An example of the vehicle member joining method relating to the present embodiment is described next. First, as shown in FIG. 1, the adhesive 30 is applied to at least one of the metal frame 10 that is made of metal and the resin panel 12 (adhesive application step).

Here, in the present embodiment, the adhesive 30 is applied to the metal frame 10 side. Concretely, the adhesive 30 is applied to the top surfaces of the horizontal portions 22A of the panel mounting portions 22 and the horizontal portions 28A of the panel mounting portions 28, to which the resin panel 12 is to be mounted. Note that the method of applying the adhesive 30 is not particularly limited. For example, a method in which the adhesive 30 is applied from a nozzle of a coating device in which the adhesive 30 is accommodated, or a method of applying the adhesive 30 by spraying or the like, may be employed.

Next, as shown in FIG. 3, in the state in which the through-holes 12A that are formed in the resin panel 12 and the through-holes 28C that are formed in the metal frame 10 (the panel mounting portions 22 of the rocker inners 14) are made to face one another, the metal frame 10 and the resin panel 12 are superposed together, and are joined by the adhesive 30 (joining step).

Finally, the rivets 32 are inserted-through the through-holes 12A and the through-holes 28C from the upper side of the resin panel 12, and the metal frame 10 and the resin panel 12 are fastened together (fastening step). Here, in the state before the rivet 32 is inserted-through the through-hole 12A and the through-hole 28C, as shown in FIG. 1, only the first head portion 32A is formed, and the second head portion 32C is not formed. Then, after the shaft portion 32B of the rivet 32 is inserted-through the through-hole 12A and the through-hole 28C, the second head portion 32C is formed due to the lower end portion of the shaft portion 32B being crushed in a state in which the first head portion 32A is pushed-against the resin panel 12.

(Operation and Effects)

Operation and effects of the vehicle member joining structure relating to the present embodiment are described next.

In the present embodiment, the elastic modulus of the adhesive 30 is made to be lower than the elastic modulus of the metal frame 10 and the elastic modulus of the resin panel 12. Due thereto, when considering a case of coating in a state in which the resin panel 12 is joined to the metal frame 10, after coating (with the adhesive), the metal frame 10 and the resin panel 12 are conveyed to a drying process, and the metal frame 10 and the resin panel 12 are heated. At this time, the metal frame 10 and the resin panel 12 thermally expand (linearly expand) by being heated. Further, a difference in linear expansions arises between the metal frame 10 and the resin panel 12 (the panel mounting portions 22). Here, because the adhesive 30 stretches in accordance with the relative displacement between the resin panel 12 and the panel mounting portions 22 that is due to the difference in linear expansions, peeling of the adhesive 30 can be suppressed.

Further, by making the elastic modulus of the adhesive 30 be lower than the elastic modulus of the metal frame 10 and the elastic modulus of the resin panel 12, even in a case in which the difference in linear expansions of the resin panel 12 and the metal frame 10 is large, thermal strain due to the difference in linear expansions can be suppressed due to the adhesive 30 elastically deforming.

Moreover, in the present embodiment, the gap between the through-hole 12A that is formed in the resin panel 12 and the shaft portion 32B is formed to be larger than the difference in linear expansions of the metal frame 10 and the resin panel 12. Due thereto, even in a case in which the metal frame 10 and the resin panel 12 are displaced relatively due to the difference in linear expansions, the gap between the through-hole 12A and the shaft portion 32B becomes a relief portion, and thermal strain can be suppressed. Note that, in the present embodiment, the gap between the shaft portion 32B and the through-hole 28C that is formed in the panel mounting portion 22 of the rocker inner 14 also is formed to be larger than the difference in linear expansions of the metal frame 10 and the resin panel 12. Therefore, relative displacement due to the difference in linear expansions of the metal frame 10 and the resin panel 12 can be avoided effectively.

Further, in the present embodiment, because the metal frame 10 and the resin panel 12 are joined by the adhesive 30 and the rivets 32, the adhesion strength can be improved as compared with a structure of joining only by the adhesive 30. In particular, in the present embodiment, as shown in FIGS. 4A and 4B, the contact surface area S1 between the second head portion 32C of the rivet 32 and the panel mounting portion 22 (the metal frame 10) is larger than the contact surface area S2 between the first head portion 32A of the rivet 32 and the resin panel 12. Here, because the fastening force of the rivet 32 depends on the contact surface area with the metal frame 10 that is made of metal, the fastening force of the rivet 32 can be improved by making the contact surface area S1 large.

Although an embodiment has been described above, the embodiment can of course be implemented in various forms. For example, in the present embodiment, as shown in FIG. 3, the adhesive 30 is not provided between the through-hole 12A and the shaft portion 32B and between the through-hole 28C and the shaft portion 32B, but the embodiments are not limited to this. For example, as in a first modified example shown in FIG. 7, there may be a structure in which the adhesive 30 is applied to the hole walls of the through-hole 12A and the through-hole 28C.

As shown in FIG. 7, in the present modified example, an adhesive 30A is applied to the hole wall of the through-hole 28C that is formed in the horizontal portion 22A of the panel mounting portion 22. Further, the adhesive 30A is similarly applied also to the hole wall of the through-hole 12A that is formed in the resin panel 12. The adhesive 30A is made integral with the adhesive 30 that is provided between the panel mounting portion 22 and the resin panel 12. The other structures are similar to those of FIG. 3.

In accordance with the present modified example, by interposing the adhesive 30 between the shaft portion 32B of the rivet 32 and the panel mounting portion 22, and between the shaft portion 32B and the resin panel 12, the panel mounting portion 22 and the resin panel 12 contacting the rivet 32 can be suppressed. As a result, even in cases in which the rivet 32 is formed of metal, electric corrosion of the panel mounting portion 22 and the resin panel 12 can be suppressed. Note that, in the present modified example, the adhesive 30A is applied to the hole wall of the through-hole 28C and to the hole wall of the through-hole 12A, but the embodiments are not limited to this, and similar effects can be obtained even if the adhesive is applied to the outer peripheral surface of the shaft portion 32B of the rivet 32.

Further, in the present embodiment, as shown in FIG. 3, the through hole 28C that is formed in the panel mounting portion 22 and the through-hole 12A that is formed in the resin panel 12 are formed to substantially the same diameter, but the embodiments are not limited to this. For example, as in a second modified example shown in FIG. 8, the through-hole 28C and the through-hole 12A may be formed to be different diameters.

Figure 8:
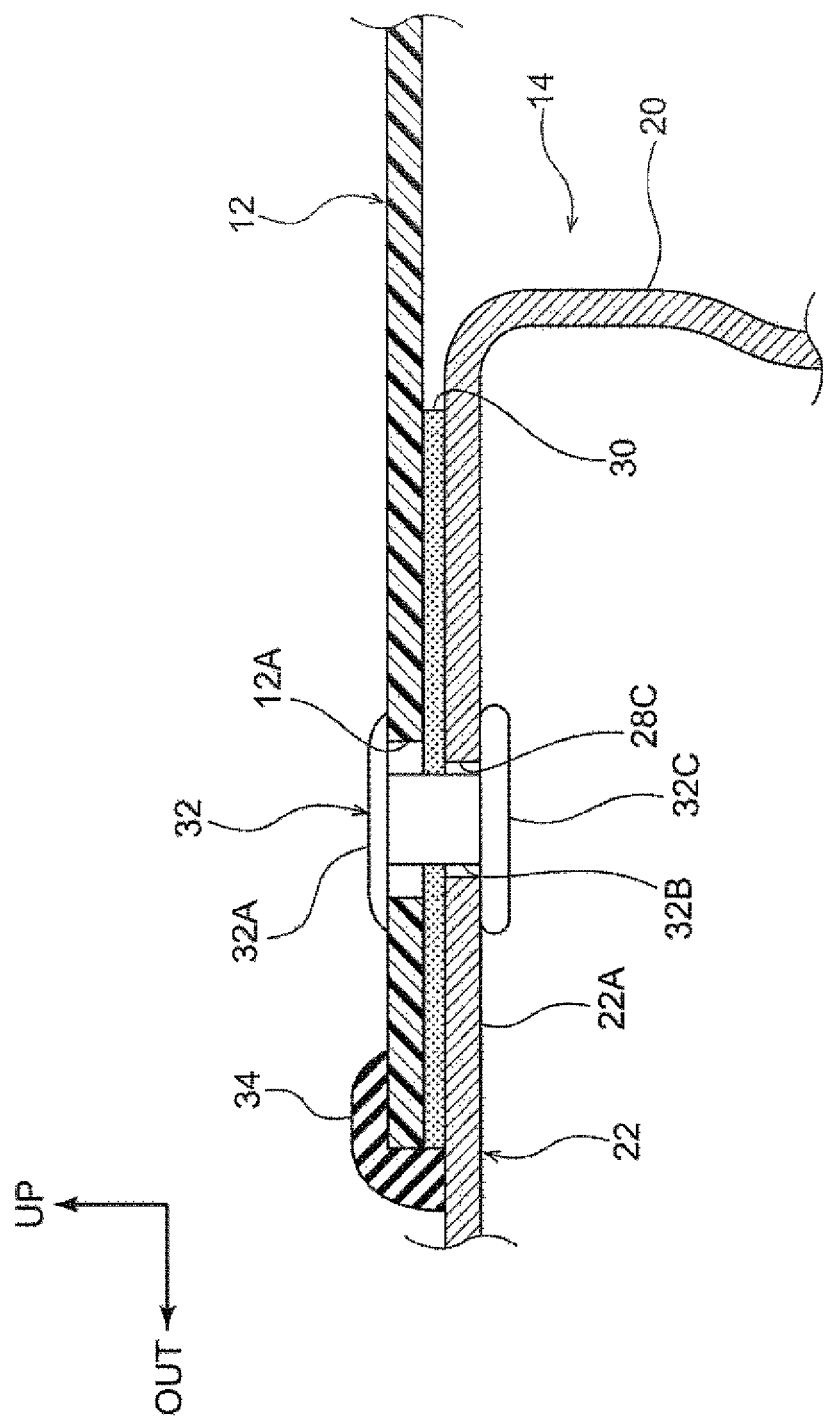
FIG. 8 is a drawing corresponding to FIG. 3 and showing a second modified example of the vehicle members relating to the embodiment.

As shown in FIG. 8, in the present modified example, the through-hole 28C is formed in the panel mounting portion 22. Further, the through-hole 12A is formed in the resin panel 12, coaxially with the through-hole 28C.

Here, the through-hole 28C of the panel mounting portion 22 is made to have a diameter that is smaller than that of the through-hole 12A of the resin panel 12. Further, in the present modified example, the gap between the hole wall of the through-hole 28C and the shaft portion 32B of the rivet 32 is formed to be smaller than the difference in linear expansions of the panel mounting portion 22 and the resin panel 12. Moreover, the gap between the hole wall of the through-hole 12A and the shaft portion 32B of the rivet 32 is formed to be larger than the difference in linear expansions of the panel mounting portion 22 and the resin panel 12. The other structures are similar to those of FIG. 3.

In accordance with the present modified example, by making the gap between the hole wall of the through-hole 28C and the shaft portion 32B of the rivet 32 small, the contact surface area between the second head portion 32C of the rivet 32 and the panel mounting portion 22 is large, and the fastening force of the rivet 32 can be improved.

Further, because the gap between the hole wall of the through-hole 12A and the shaft portion 32B of the rivet 32 is formed to be larger than the difference in linear expansions of the panel mounting portion 22 and the resin panel 12, at the time of heating, the gap between the through-hole 12A and the shaft portion 32B becomes a relief portion. As a result, relative displacement due to the difference in linear expansions of the panel mounting portion 22 and the resin panel 12 can be absorbed, and thermal strain can be suppressed.

Further, the present embodiment supposes heating temperatures in a drying process after coating of the adhesive, but the embodiments are not limited to this. The elastic modulus and the rate of elongation of the adhesive 30 may be set by supposing a case of heating at a temperature that is higher than heating temperatures in a drying process.

Moreover, the present embodiment describes a joining structure of the metal frame 10 and the resin panel 12, but the embodiments are not limited to this and may be applied to a joining structure of another metal member and resin member. For example, the embodiments may be applied to a pillar or a stack frame or the like, and, in particular, can be applied to joining structures at which the difference in linear expansions of a metal member and a resin member at the time of heating in a drying process after coating is of concern.

Further, although the rivet 32 is used as the fastening member in the present embodiment, the embodiments are not limited to this, and another fastening member may be used. For example, a bolt and nut may be used. In this case, the head portion of the bolt corresponds to the first head portion, and the nut that is screwed-together with the bolt corresponds to the second head portion.

What is claimed is:

1. A vehicle member joining structure comprising:
a metal member that is part of a vehicle;
a resin member that is adjacent to the metal member; and
an adhesive that is provided between the metal member and the resin member and joins the metal member to the resin member, the adhesive having an elastic modulus that is lower than elastic moduli of the metal member and the resin member, wherein
a first through-hole is formed in the metal member, and a second through-hole is formed in the resin member coaxially with the first through-hole,
a fastening member that fastens the metal member and the resin member together is inserted through the first through-hole and the second through-hole,
a gap between a shaft of the fastening member and an inner periphery of at least one of the first through-hole and the second-through hole is larger than a difference in linear expansions of the metal member and the resin member at a time of heating of the vehicle member joining structure in a drying process of the adhesive,
the fastening member has (1) a first head that extends along the resin member from a first end of the shaft and anchors on the resin member, and (2) a second head that extends along the metal member from a second end of the shaft and anchors on the metal member, and
a surface area of a first region at which the metal member and the second head overlap as seen from an axial direction of the fastening member is larger than a surface area of a second region at which the resin member and the first head overlap as seen from the axial direction of the fastening member.

2. The vehicle member joining structure of claim 1, wherein the adhesive is provided between the shaft and the metal member and between the shaft and the resin member.

3. The vehicle member joining structure of claim 1, wherein the metal member is a cross member inner of the vehicle.

4. The vehicle member joining structure of claim 1, wherein the metal member is a rocker inner panel of the vehicle.

* * * * *